United States Patent
Kufner

(10) Patent No.: US 7,976,257 B2
(45) Date of Patent: Jul. 12, 2011

(54) PROFILE RAIL

(75) Inventor: Johann Kufner, Aholming/Tabertshausen (DE)

(73) Assignee: Ideematec Deutschland GmbH, Wallerfing (DE)

( * ) Notice: Subject to any disclaimer, the term of this patent is extended or adjusted under 35 U.S.C. 154(b) by 331 days.

(21) Appl. No.: 12/069,573

(22) Filed: Feb. 11, 2008

(65) Prior Publication Data

US 2008/0292424 A1  Nov. 27, 2008

(30) Foreign Application Priority Data

Feb. 12, 2007  (DE) .................... 20 2007 002 232 U

(51) Int. Cl.
*F16B 27/00*  (2006.01)

(52) U.S. Cl. ............ 411/84; 411/85; 411/277; 411/278; 411/437

(58) Field of Classification Search .................... 411/81, 411/84, 85, 346, 437, 522, 525, 529, 277–278; 52/41–44, 60, 200, 208–209, 235, 495

See application file for complete search history.

(56) References Cited

U.S. PATENT DOCUMENTS

| | | | | |
|---|---|---|---|---|
| 744,559 | A * | 11/1903 | Kendrick | 409/225 |
| 781,571 | A * | 1/1905 | Thomas | 411/437 |
| 1,957,933 | A | 5/1934 | Brandl | 189/36 |
| 2,163,446 | A * | 6/1939 | Heckman | 52/709 |
| 2,676,680 | A * | 4/1954 | Kindorf | 403/22 |
| RE24,133 | E * | 3/1956 | Bloedow | 403/403 |
| 3,564,666 | A * | 2/1971 | Dold | 24/320 |
| 3,844,087 | A * | 10/1974 | Schultz et al. | 52/200 |
| 4,439,969 | A * | 4/1984 | Bartlett | 52/461 |
| 5,074,731 | A * | 12/1991 | Schneider | 411/437 |
| 5,164,020 | A * | 11/1992 | Wagner et al. | 136/251 |
| 5,429,467 | A * | 7/1995 | Gugle et al. | 411/182 |
| 5,533,640 | A * | 7/1996 | Jolly | 220/216 |
| 5,628,598 | A * | 5/1997 | Hofle | 411/85 |
| 5,655,865 | A * | 8/1997 | Plank et al. | 411/85 |
| 5,678,383 | A * | 10/1997 | Danielewicz | 52/775 |
| 7,634,875 | B2 * | 12/2009 | Genschorek | 52/173.3 |
| 2003/0070368 | A1* | 4/2003 | Shingleton | 52/173.3 |
| 2003/0198530 | A1* | 10/2003 | Hoffmann et al. | 411/84 |

FOREIGN PATENT DOCUMENTS

| | | |
|---|---|---|
| CH | 583400 | 12/1976 |
| DE | 9215529.4 | 4/1993 |

* cited by examiner

*Primary Examiner* — Victor Batson
*Assistant Examiner* — Roberta S Delisle
(74) *Attorney, Agent, or Firm* — Andrew Wilford

(57) ABSTRACT

A profile rail has a face and is formed with a longitudinally extending channel open at the face and with longitudinally extending stabilizing formations on the face flanking the channel. The channel has confronting ribbed flanks. A stabilizing element has a face engageable with the face of the rail and formed with a pair of stabilizing formations fittable with the stabilizing formations of the rail and with a throughgoing hole between the respective stabilizing formations and aligned with the channel when the element stabilizing formations are fitted with the rail stabilizing formations. A screw fittable through the hole has a screwthread engageable with the flanks of the channel so that the screw can clamp the element to the face of the rail.

11 Claims, 5 Drawing Sheets

PROFILE RAIL

The present invention relates to a profile rail with at least one screw-thread channel formed on one surface.

Profile rails are known from the prior art. Among other things, they function as mounting rails for fastening planar elements like, for example, solar panels or solar collectors.

The connection of these profile rails, for the most part consisting of aluminum, is most often done by threaded screws. To this end a longitudinally extending channel is formed in the aluminum section. In this configuration various parts such as V-nuts, T-head screws, hex screws or hex nuts may be threaded, snapped and anchored in place.

A disadvantage of this type of connection is considerable threading and positioning of the part. When the seat channel is in an inconvenient position, the screw nuts are not visible and must then be fastened by the screws in precise locations. If these screw elements that are slid into the receiving channel are not provided with a somewhat expensive clamping system, they will come free longitudinally to slide in the channel and complicate mounting.

A known development is the formation of a screw channel that also extends longitudinally of the section. This has a width that corresponds to the thread diameter of a self-tapping screw. Turning the screw causes the threads of the screw to engage into the side flanks of the channel and form a screw joint.

A disadvantage of this screw joint is the difficult insertion of the screw that squeezes its threads into the channel and presses it apart. Solid locking of the screw joint is only conditionally given since the actual interfit with the threads only takes place on a small surface according to the depth of the threaded flanks.

In aluminum extrusion press sections the screw channels are so formed that its side flanks are ribbed. If the arrangement and formation of the ribs correspond to the threads of a screw they can be inserted in this screw channel. If the threads are set at a sharp angle, the seat channel is spread by the tightening of the screw and the support surface of the screw threading decreases even more. A further disadvantage is the through-going screw channel that enables adjustment of the screw position longitudinally of the seat channel. While there is a bearing stress with a standard screw joint, only the contact pressure of the screw on both flanks of the screw channel can actually form a stop. If the screw not tightened enough, there is the danger that it will shift longitudinally of the screw channel with the stress that occurs.

If the screw joint is tightened too much, however, the pressing apart of the side flanks of the seat channel by the screwthreads, the support surface of the threading, and holding force as well is decreased. There is the danger that the soft aluminum will be deformed and the screw joint will be unusable if the bearing stress of the screw threads acts upon the outer ribs of the spread screw channel.

The object of the present invention is to provide a profile rail that overcomes the disadvantages of the prior art.

This object is attained by a profile rail with at least one screw-thread channel formed on one surface; it is characterized in that at least one stabilizing element is assigned for the stabilization of the screw channel when inserting a screw; and this has a hole for guiding a screw to be inserted into the screw channel as well as two stabilizing formations that are form fitted to the profile rail left and right of both edges of the screw channel.

The screw channel with lengthwise ribs formed in the profile rail on both flanks, that correspond to the thread of a screw to be inserted, presents the advantage that no part has to be put into the seat channel and exactly positioned.

The two or more stabilizing formations of the stabilizing element that are form fitted to the profile rail left and right of both edges of the screw channel counteract spreading of the screw channel when inserting a screw. In this way they stabilize the screw joint and thus prevent loosening of the screw joint or the longitudinal shifting of the screw in the screw channel. By form fitting the stabilizing formations with the profile rail a rigid connection is produced that does not enable rotation about the screw axis and thereby prevents loosening.

In a preferred embodiment of the profile rail of the invention the two or more stabilizing formations are ridges and/or lugs. In particular, ridges are advantageous in the production of a stabilizing formation since this is often an extrusion. Besides simple manufacture, ridge-type stabilizing formations produce a particularly stable hold of the screw in the screw channel.

In a further embodiment of the profile rail of the invention, this has at least one, preferably two, grooves running parallel to the screw channel for seating the stabilizing formations (e.g. ridges) preferably have a shape corresponding to the shape of the grooves. Preferably two grooves are oriented such that the screw channel lies between the two grooves. The stabilizing formations of the stabilizing element are pressed into these grooves before a corresponding screw is screwed into the screw channel.

The spacing between the stabilizing formations of the stabilizing element can be measured so that they touch the two opposite outer faces of the profile rail, so that the stabilizing element can be snapped onto the profile rail. In this embodiment the stabilizing element surrounds the profile rail across its entire width or height.

With a special embodiment of the profile rail of the invention the spacing and shape of the stabilizing formations act in such a manner with the spacing and shape of the grooves of the profile rail that the stabilizing element is fixable in a form-fit manner on the profile rail with the help of the stabilizing formations, so that preferably the flanks of the screw channel are pressed together. This way the rib profile of the inner walls of the screw channel will be pressed against the screw. With such a contact pressure the holding force of the screw in the screw channel is improved and the screw is both clamped and secured. This can be achieved, for example, if the grooves of the profile rail are at least partially closer than the corresponding stabilizing formations (e.g. ridges). In that way the stabilizing formations have to be pressed into the grooves with some effort.

Advantageously the profile rail is an extruded section, preferably an aluminum extrusion. This way the longitudinal formations (that is, grooves) can be formed in the outer surface of the rail.

Advantageously the stabilizing element is an extrusion, preferably an aluminum extrusion. This also facilitates—as already mentioned above—its manufacture (e.g. with ridges).

Preferably the profile rail is tubular. This enables a savings of material and weight.

In a special embodiment of the profile rail of the invention, the stabilizing element is at the same time a part connecting to the rail-type element, particularly a connecting part to join the profile rail with a further profile rail. This part has the above mentioned stabilizing formations that are form fitted to the bearing surface of the profile rails and fitted into their grooves. The stabilizing elements (e.g. ridges), located for example in both grooves left and right of the screw channel, counteract the spreading of the screw channel by tightening the screw. A rigid connection is produced by the form closure of the screwed-on part; this does not allow any turning on the axis of the screw so the screw is held tightly in place. The part in question can be a coupling for joining two profile rails (see FIG. 8).

With one embodiment of the profile rail of the invention the stabilizing formations are of trapezoidal section. In combination with a right-angled groove that is somewhat narrower than the widest part of the stabilizing formation the above-mentioned advantages of the pressing together of the flanks of the screw channel may be achieved.

The present invention further concerns a stabilizing element for making the screw channel of a profile rail stable when inserting a screw; it comprises a hole for receiving the screw to be inserted in the screw channel of the profile rail as well as at least two stabilizing formations that are form fitted to the profile rail.

With the stabilizing element of the invention the advantages of stabilizing the screw channel of a profile rail as outlined above can be achieved.

Advantageously the two or more stabilizing formations of the stabilizing element of the invention are ridges and/or lugs. In particular, stabilizing elements with ridges are simple to manufacture, especially when dealing with an extruded stabilizing element.

In a preferred embodiment the stabilizing element is an extrusion, preferably an aluminum extrusion.

The stabilizing element of the invention can have further devices for fastening further profile rails and/or stabilizing elements. A stabilizing element of such a kind is shown in FIG. 8.

A special embodiment of the stabilizing element of the invention is one of which the face bearing the stabilizing formations in essence forms the opposite face. Such a stabilizing formation is suited for joining two profile rails to each other at any angle.

Additional features of the invention follow from the description below of the preferred embodiments of the invention in connection with the figures and dependent claims. Individual features can be appreciated for themselves alone or in combination with each other. In the drawing:

Figure 1:
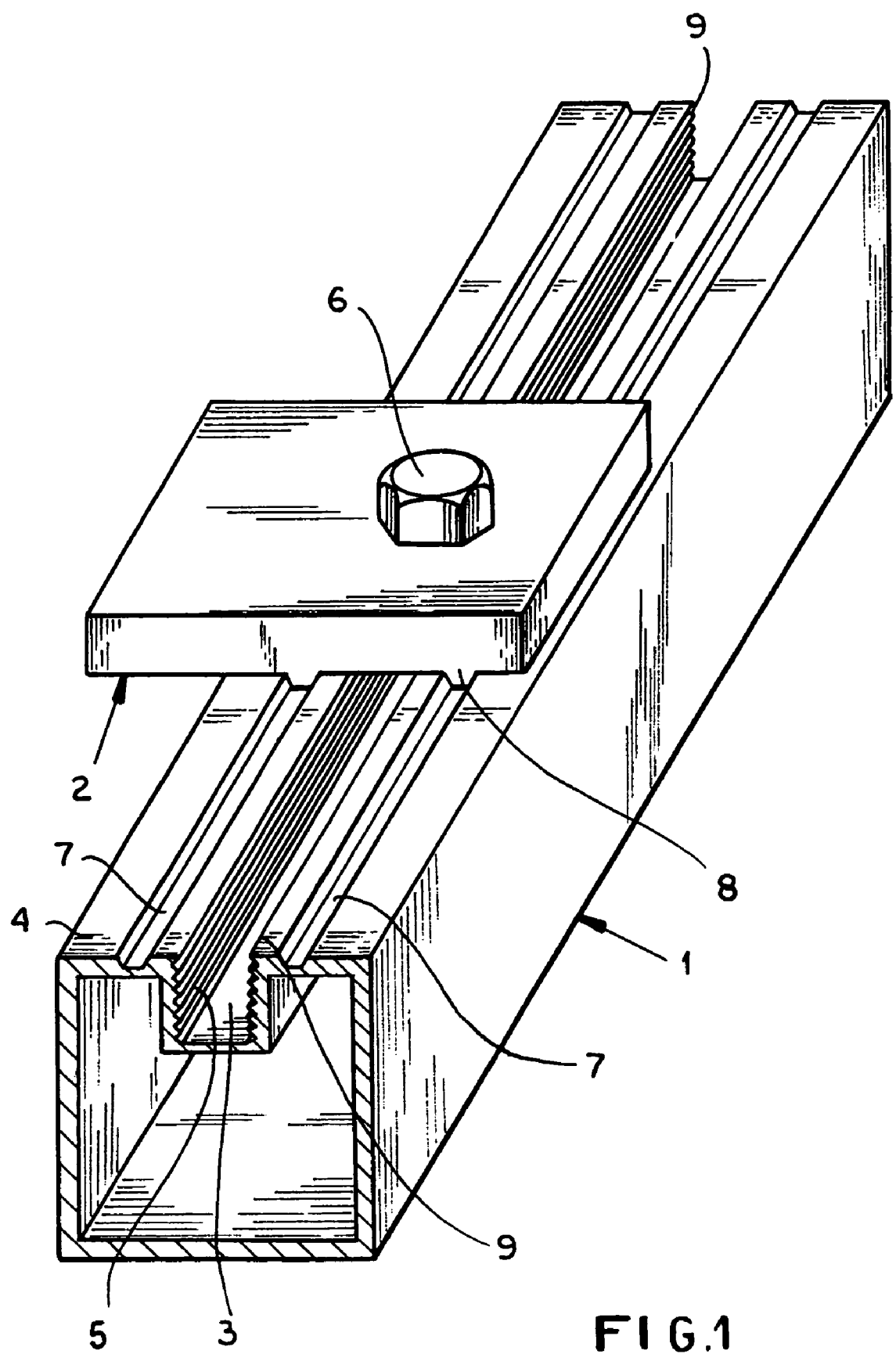
FIG. 1 is a perspective view of a profile rail (profile rail) according to the invention with a stabilizing element fastened on it.

FIG. 1 shows a perspective view of a profile rail 1 according to the invention with a stabilizing element 2 fastened to it. The profile rail 1 has a longitudinally extending screw channel 3 opening at an outer surface 4. The screw channel 3 also has longitudinally extending ribs 5 on the profile rail 1 for screw-thread engagement with one or more screws 8. The profile rail 1 is formed as a hollow profile and is made of aluminum. Left and right next to the screw channel 3 the profile rail 1 also has grooves 7 formed in the outer surface 4 and running longitudinally of the profile rail 1. These grooves 7 have a slightly trapezoidal shape, that is the flanks of the grooves extend at a slightly obtuse angle to each other. The stabilizing element 2 has a hole for passage of a screw 6 that in this drawing, however, is covered by the screw 6 and cannot be seen. The stabilizing element 2 is made by extrusion. The stabilizing element 2 has two ridges 8 running parallel as well. The ridges 8 are of trapezoidal shape. Moreover, the spacing between the two grooves 7 is somewhat greater than the spacing between the two ridges 8. In this way and as a result of the trapezoidal shape of the grooves and the ridges the side flanks 9 of the screw channel 3 are somewhat squeezed together when the ridges 8 are forced into the grooves 7 so that the screw 6 is additionally secured together and held. In this way the screw is prevented from slipping longitudinally in the screw channel.

Figure 2:
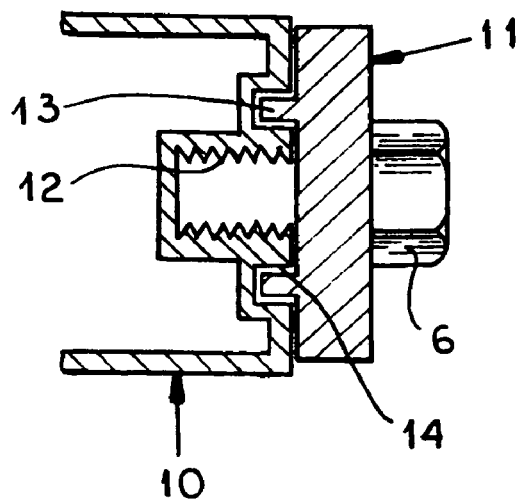
FIG. 2 is a cross section through a profile rail according to the invention with a screwed-on stabilizing element.

FIG. 2 shows a cross section through a further embodiment of a profile rail 10 according to the invention with a stabilizing element 11 fastened to it. The stabilizing element is fastened by a screw 6 that is screwed into the screw channel 12 of the profile rail 10. The stabilizing element 11 has rectangular stabilizing ridges 13 that fit in complementarily formed grooves 14.

Figure 3:
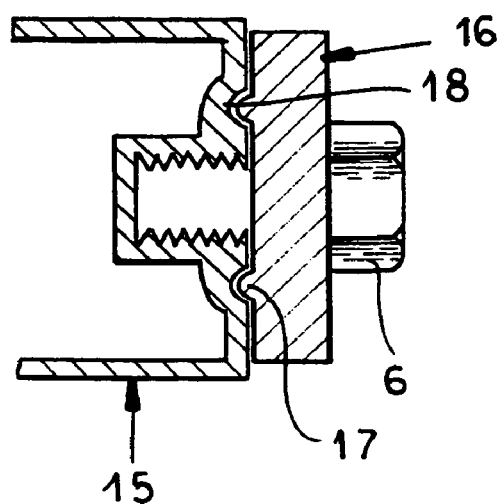
FIG. 3 is a cross section through a profile rail according to the invention with a screwed-on stabilizing element.

FIG. 3 also shows a cross section through a profile rail 15 according to the invention with a screwed-on stabilizing element 16 and where the stabilizing ridges 17 of the stabilizing element 16 as well as the grooves 18 also running longitudinally of the profile rail are of rounded shape.

Figure 4:
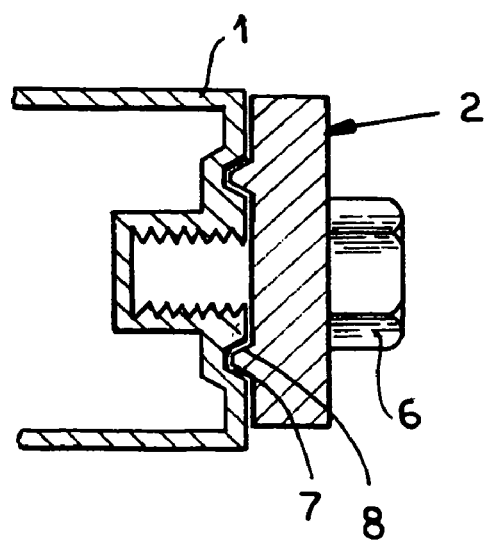
FIG. 4 is a cross section through a profile rail according to the invention with a screwed-on stabilizing element.

FIG. 4 shows a cross section through the profile rail 1 from FIG. 1 with the stabilizing element 2 fastened to it and where the grooves as well as the ridges 8 are trapezoidal.

Figure 5:
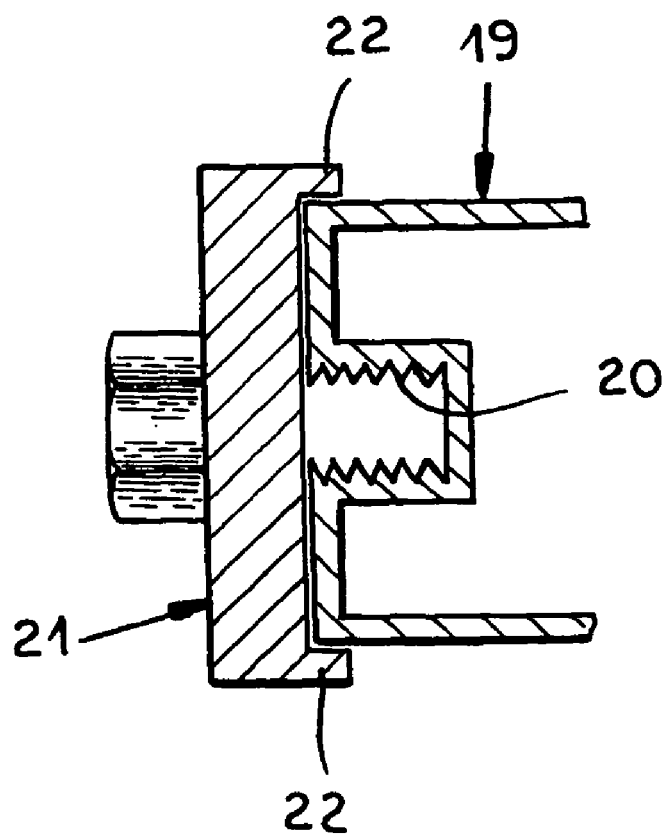
FIG. 5 is a cross section through a profile rail according to the invention with a screwed-on stabilizing element.

FIG. 5 shows a further embodiment of a profile rail 19 according to the invention in cross section. This profile rail 19 does not have special grooves for receiving a stabilizing ridge. In this example stabilization of the screw channel 21 of the profile rail 19 takes place by means of a stabilizing element 21 in which stabilizing ridges 22 are provided on two opposite ends. The stabilizing element 21 is dimensioned and fitted to the dimensions of the profile rails 21 so that it can be clipped onto the profile rail 19. Thus the stabilizing ridges 22 serve as holding elements that on one hand enable a form-fit connection between the profile rail 19 and the stabilizing element 21 and on the other hand stabilize the screw channel 20 for insertion of a screw 6 so that they compress the screw channel 20. In this embodiment the stabilizing element 21 grips the profile rail 19 over its entire width. It is also conceivable that the stabilizing element 19 only grips one side face of the profile rail if there are corresponding contact possibilities for the stabilizing ridges 22.

Figure 6:
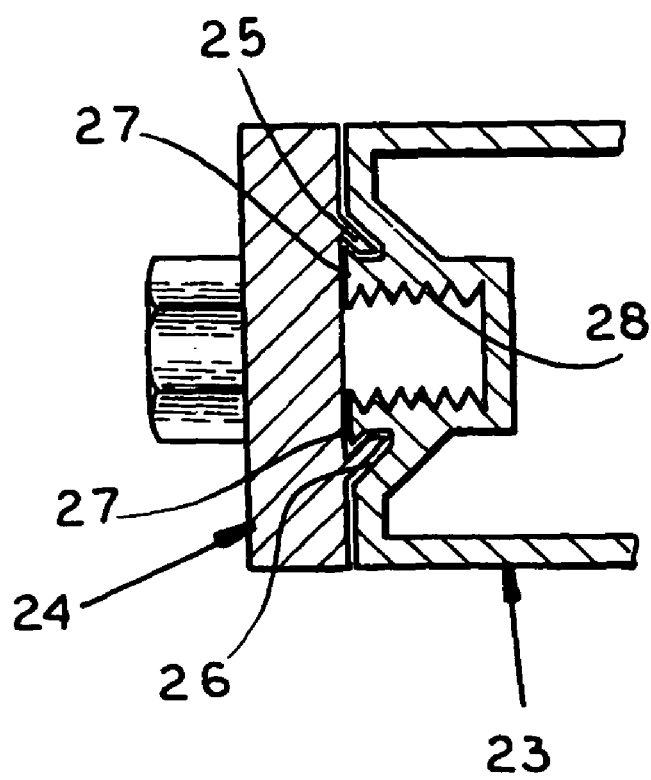
FIG. 6 is a cross section through a profile rail according to the invention with a screwed-on stabilizing element.

FIG. 6 also shows a cross section through another embodiment of a profile rail 23 according to the invention with a secured stabilizing element 24. The stabilizing element 24 has angled stabilizing ridges 25. The profile rail 23 has grooves 26 that are complementary to the shape of the stabilizing ridges 25. The profile rail further has little lugs on the upper rim of the grooves that enable the stabilizing ridges 25 to click into the grooves 25 of the profile rail 23. This serves to fix the stabilizing element during mounting. Tightening of the screw causes the angled stabilizing ridges 25 to press into the complementarily shaped grooves 26 of the profile rail 23 and press the screw channel 28 together.

Figure 7:
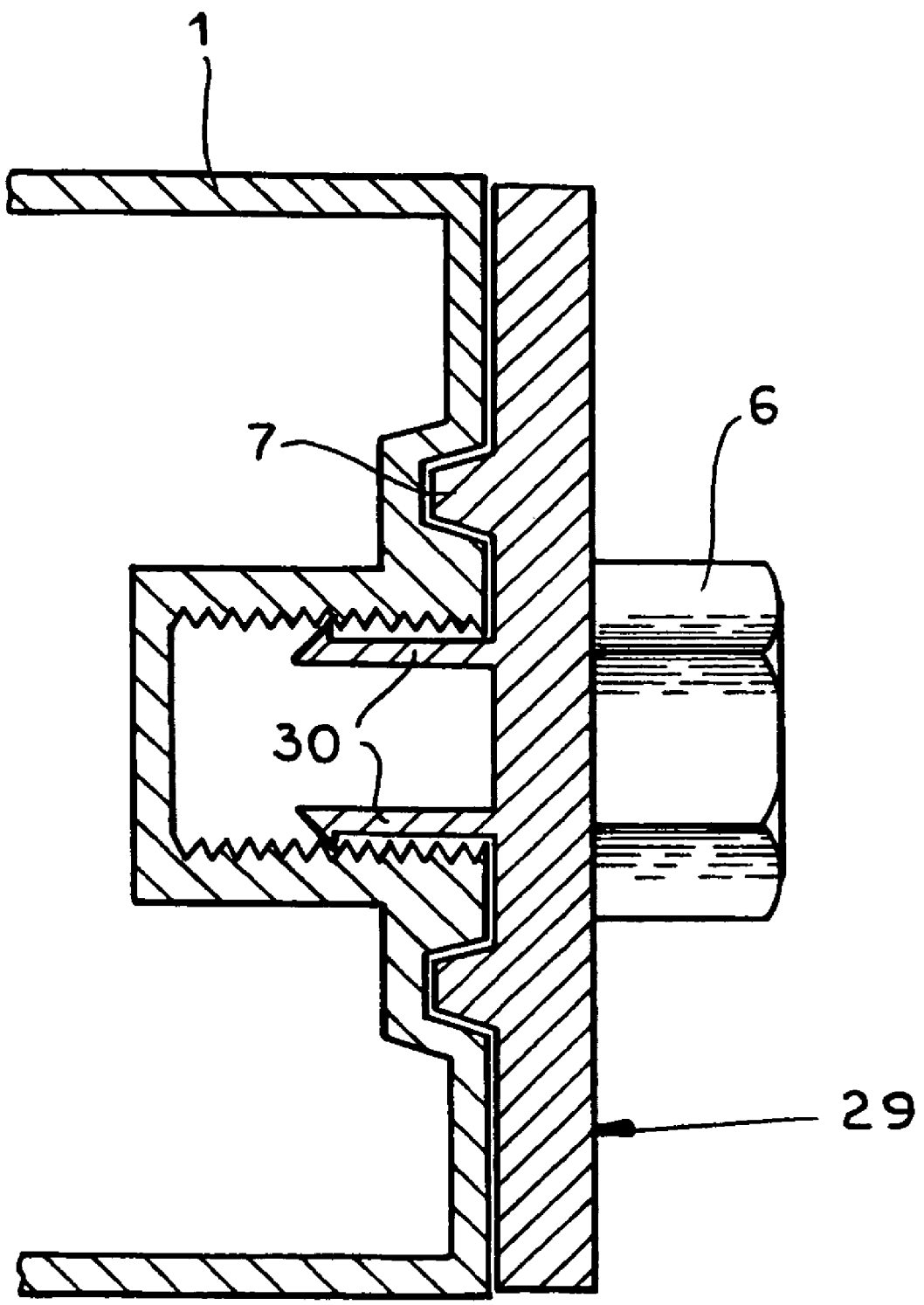
FIG. 7 is a cross section through a profile rail according to the invention with a screwed-on stabilizing element.

FIG. 7 shows a cross section through the profile rail 1 from FIG. 1 where the stabilizing element fitted to the profile rail 1 and fastened to it has holding lugs 30. These holding lugs 30 are so shaped that they can snap into the screw channel 3 and fix the stabilizing element 29 during mounting so longitudinal shifting along the screw channel 3 is possible.

Figure 8:
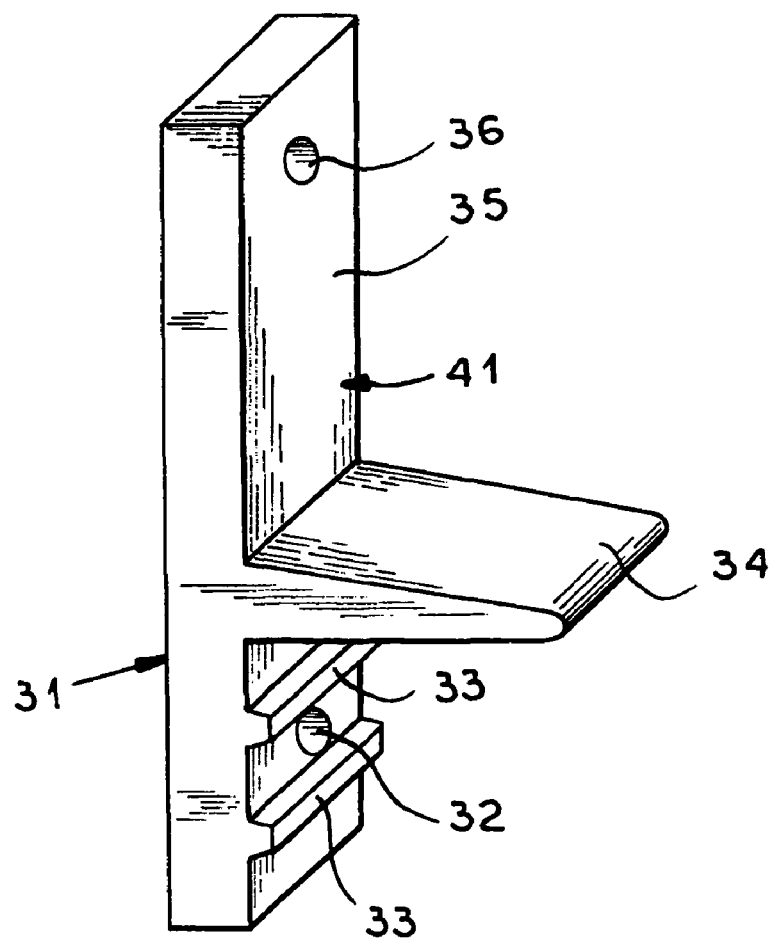
FIG. 8 is a perspective view of a stabilizing element according to the invention.

FIG. 8 shows a perspective view of a stabilizing element 31 according to the invention that functions as a part connecting two profile rails as well. In a lower part the stabilizing element has elements according to the invention, namely an opening 32 for a screw as well as two stabilizing ridges 33. The stabilizing element 31 in the present embodiment is made from a piece of an aluminum extrusion. In addition, the stabilizing element 31 has a support 34 that serves for a load distribution on an underlying profile rail. A fastening link 35 extending upward with a planar surface 41 has a hole 36 and enables the joining of a further profile rail. Since the stabilizing formations (e.g. stabilizing ridges) according to the invention can only be fastened extending longitudinally, the bearing surface for the other rail is kept planar.

Figure 9:
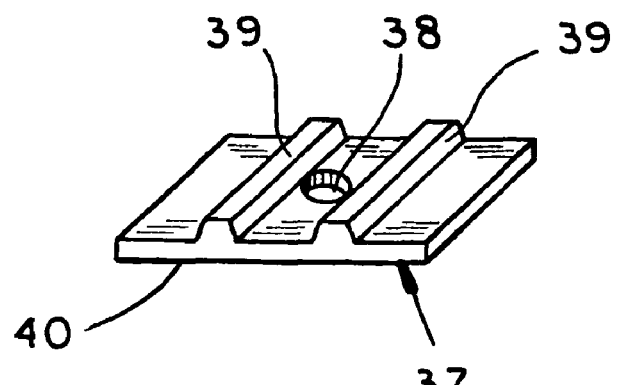
FIG. 9 is a perspective view of a stabilizing element according to the invention.

FIG. 9 shows a further embodiment of a stabilizing element 37 according to the invention that is made from an aluminum extrusion as well and has an opening 38 and two stabilizing ridges 39. The face 40 opposite the face formed with the ridges 39 is planar. The entire part is kept as thin as possible. The planar face of the stabilizing element 37 is engaged with the face 41 of the part 31 from FIG. 8 so that both openings 36 and 38 are aligned. The combination of the two elements 31 and 37 makes possible an angularly adjustable connection with a further profile rail. The stabilizing ridges 39 also stabilize the screw channel of a profile rail. Adjustment of the construction is possible before axially tightening the screw.

An experimental testing of the efficiency of a stabilizing element was carried out by TÜV Bayern. The results of this testing show the enormous stabilization of a screw channel when a screw is inserted and they are shown in the following:

Test Report: Stress Values in the Screw Channel of an A1 Rail:
40×40 mm aluminum hollow profile rail with a screw channel throughout for a 8 mm metric thread screw with a screw depth of 13 mm.

Vertical Pull:
Without stabilization of the screw channel:

1.8KN/2.0KN/2.1KN=average 1.97KN

With stabilization of the screw channel (stabilizing ridges, right and left):

4.8KN/5.7KN/5.3KN=average 5.27KN.

Horizontal Pull:
Without stabilization of the screw channel:

1.7KN/2.0KN/1.9KN=average 1.87KN

With stabilization of the screw channel (stabilizing ridges, right and left):

3.1KN/3.8KN/2.9KN=average 3.27KN.

These test results show the enormous advantage of the stabilizing elements and profile rails according to the invention regarding stabilization of the screw connections.

The invention claimed is:

1. In combination:
a profile rail having a face and formed with a longitudinally extending channel open at the face and with longitudinally extending stabilizing formations on the face flanking the channel, the channel having confronting ribbed flanks;
a stabilizing element having a face engageable with the face of the rail and formed with a pair of stabilizing formations fittable with the stabilizing formations of the rail and with a throughgoing hole between the respective stabilizing formations and aligned with the channel when the element stabilizing formations are fitted with the rail stabilizing formations, the formations of one of the faces being a pair of ridges projecting from the one face and the formations of the other of the faces being generally complementary grooves opening at the other face, a transverse spacing between the formations of the element being slightly smaller than a transverse spacing between the formations of the rail and the rail being limitedly elastically deformable so that when the formations of the element are fitted to the formations of the rail the flanks of the channel are pressed together; and
a screw fittable through the hole and having a screwthread engageable with the flanks of the channel, whereby the screw can clamp the element to the face of the rail.

2. The combination defined in claim 1 wherein the formations of the rail face are full-length longitudinal grooves open at the face, the formations of the element face being full-length longitudinal ridges.

3. The combination defined in claim 1 wherein the formations of one of the faces have angled faces that cam together the flanks of the channel when the formations are fitted together.

4. The combination defined in claim 1 wherein the formations of the one face are triangular-section ridges.

5. The combination defined in claim 1 wherein the formations of the one face are of trapezoidal section.

6. The combination defined in claim 1 wherein the formations of one of the faces are ridges formed on transversely confronting faces with confronting transversely open grooves, the formations on the other of the faces being grooves having transversely oppositely directed faces formed with ridges fittable in the grooves on elastic deformation of the formations or channel.

7. The combination defined in claim 1 wherein the rail is an extrusion.

8. The combination defined in claim 7 wherein the extrusion is of aluminum.

9. The combination defined in claim 1 wherein the element has a pair of elastically deformable lugs engageable in the channel and having barbs engageable in the ribbed flanks.

10. The combination defined in claim 1 wherein the element is formed parallel to its first-mentioned face with a flat second face and with a throughgoing hole open at the flat second face, the combination further comprising
another stabilizing element having a front face engageable with the face of another such rail and formed with a pair of stabilizing formations fittable with the stabilizing formations of the other rail and with a throughgoing hole between the respective stabilizing formations and a flat back face flatly engageable with the second flat face of the element, whereby another screw can pass through the holes and engage in the channel of the other rail and lock both rails together relatively pivotal about an axis of the other screw.

11. The combination defined in claim 1 wherein the stabilizing element is slidable along the face of the rail with its stabilizing formation in the rail stabilizing formations and the hole aligned with the channel.

\* \* \* \* \*